UNITED STATES PATENT OFFICE.

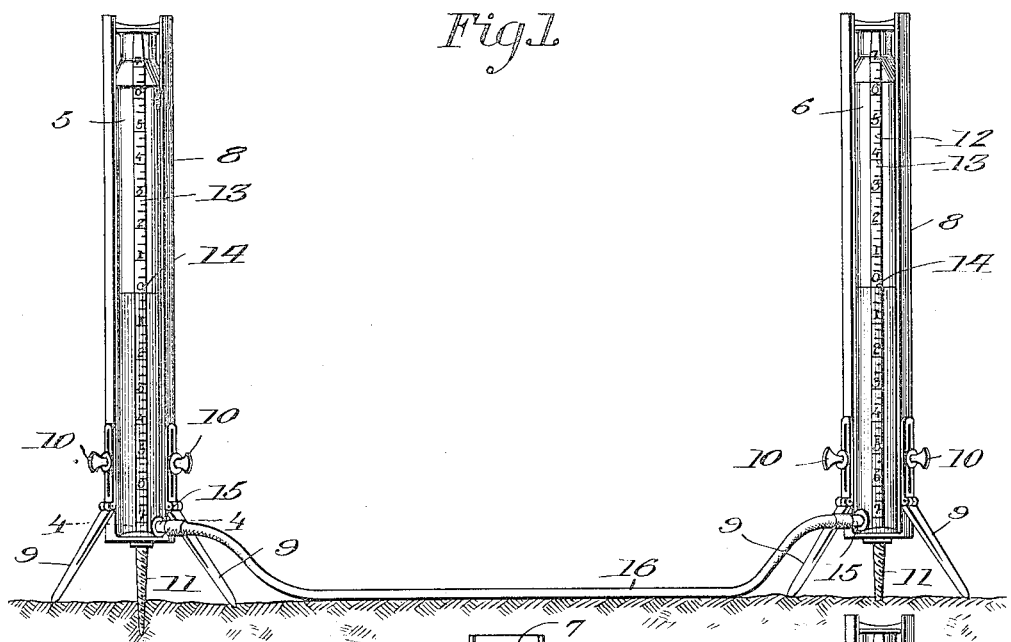
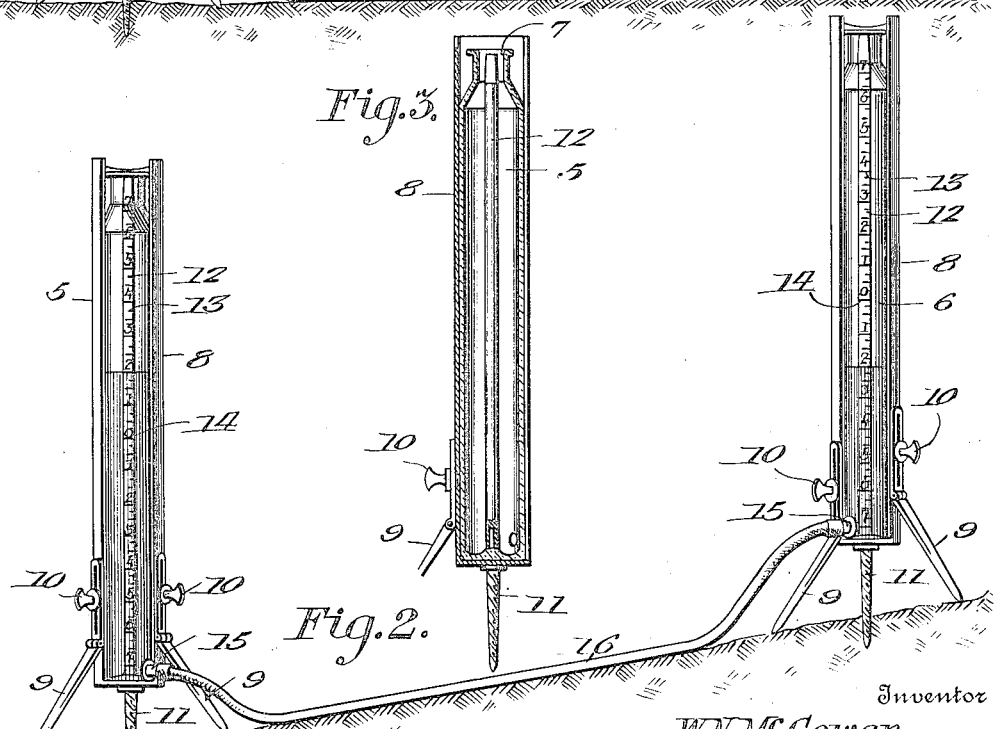

WILLIAM N. McGOWAN, OF CROATAN, NORTH CAROLINA.

SURVEYING INSTRUMENT.

1,042,248.   Specification of Letters Patent.   Patented Oct. 22, 1912.

Application filed December 13, 1911. Serial No. 665,470.

*To all whom it may concern:*

Be it known that I, WILLIAM N. Mc-GOWAN, a citizen of the United States, residing at Croatan, in the county of Craven and State of North Carolina, have invented new and useful Improvements in Surveying Instruments, of which the following is a specification.

The invention relates to a surveying instrument, and more particularly to the class of hydrostatic surveying instruments.

The primary object of the invention is the provision of an instrument of this character in which grades or levels in ground or other surfaces may be readily and accurately determined, the instrument being adaptable for use by bricklayers, masons, carpenters, or other skilled mechanics for obtaining accuracy in work.

Another object of the invention is the provision of a surveying instrument for use in grading or laying out level surfaces, so that the user may survey between any two points on a predetermined grade or level, thereby permitting an accurate calculation of the grade or level.

A further object of the invention is the provision of a surveying instrument of this character in which the supports therefor may be readily and easily adjusted, so as to position the instrument in a true vertical position, irrespective of the irregularity in the surface of the ground, and that may be fastened to the ground, so as to prevent the possibility of the falling of the instrument when in use.

A still further object of the invention is the provision of a surveying instrument of this character which is simple in construction, reliable and efficient in its purpose, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a surveying instrument constructed in accordance with the invention, shown applied to a level surface. Fig. 2 is a similar view, showing the same applied to a grade. Fig. 3 is a vertical longitudinal sectional view through the instrument. Fig. 4 is a sectional view on the line 4—4 of Fig. 1.

Similar reference characters indicate corresponding parts throughout the several views of the drawings.

Referring to the drawings by numerals, 5 and 6 designate complementary measuring bodies or tubes, the same being preferably constructed from glass, although they may be made from any other suitable transparent material, if desired, each being formed with a contracted open end 7, through which liquid is introduced therein. These tubes 5 and 6 are preferably set in frames 8 provided at their lower ends with adjustable feet or legs 9, the latter being secured in adjusted position by means of the usual set screws 10. Thus in this manner the tubes may be arranged vertically, irrespective of the irregularity in the surface to be measured. Formed centrally in the lower ends of the frames 9 and projecting therefrom are screws 11, which latter are adapted to engage in the ground or surface to be measured, so as to prevent the tilting of the measuring tubes when in use. Disposed within the tubes 5 and 6 are stationary measuring stems 12, the same rising centrally from the bottoms of the tubes and being coextensive with the length of the tubes, the said stems 12 being provided with measuring scales 13 on their outer surfaces, so as to coöperate with the columns of liquid rising within the tubes about the said stems, whereby grades or levels in surfaces may be determined between two predetermined points. The zero mark 14 of the scales 13 is located at a medial point of the stems 12 and the numbers of the said scales are disposed up and down thereon from the zero point thereof, as is clearly shown.

In the reading of the scales, the liquid rising in either of the tubes 5 and 6 above the zero mark indicates the rise in the grade or surface, while the lowering of the liquid in said tubes below the zero mark indicates a fall in the surface, the scales 13 being clearly visible exteriorly of the tubes 5 and 6 for the reading thereof.

Formed at the bottoms of the tubes 5 and 6 and projecting outwardly from one side thereof are nipples 15, to which are connected the ends of a flexible tube or pipe 16, which establishes communication between the said tubes 5 and 6, so that the liquid contained in the said tubes may flow from one to the other, during the manipulation of the instrument. A sufficient quantity of water is poured into the tubes 5 and 6 to entirely fill the pipe 16, and each of the tubes part way, so that when the tubes stand at the same level, the reading, as indicated by the height of the water, will be the same in both tubes, but on placing the tubes at predetermined points of the grade, the water in the lowermost tube will rise to a greater height than the water in the higher tube, so that upon reading of the scales 13 upon the stems 12, the exact fall in the grade may be accurately ascertained.

What is claimed is:

1. The combination with transparent liquid containing measuring tubes of housings telescoped over and detachably receiving said tubes and each having a slot longitudinally therein to permit visual inspection of the contents of the tube, flexible tubing connecting said first named tubes, an anchoring screw depending centrally from each of the housings and adapted to engage in the ground, slotted slides, set screws passed through the slides and engaged in the housings for locking the slides in adjusted position, and props hinged to the slides.

2. The combination with transparent liquid containing measuring tubes of housings telescoped over and detachably receiving said tubes and each having a slot longitudinally therein to permit visual inspection of the contents of the tube, flexible tubing connecting said first named tubes, an anchoring screw depending centrally from each of the housings and adapted to engage in the ground, slotted slides, set screws passed through the slides and engaged in the housings for locking the slides in adjusted position, props hinged to the slides, and stationary measuring rods rising centrally interiorly of the first named tubes from the bottoms thereof and having graduation marks extending in opposite directions from medial points thereof.

In testimony whereof I affix my signature in presence of two witnesses.

WILLIAM N. McGOWAN.

Witnesses:
J. C. Thomas, Jr.,
L. S. Wood.